United States Patent
Nan et al.

(10) Patent No.: US 8,749,973 B2
(45) Date of Patent: Jun. 10, 2014

(54) ELECTRONIC DEVICE ENCLOSURE

(75) Inventors: Xu-Dong Nan, Wuhan (CN); Zhi-Ping Wu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 101 days.

(21) Appl. No.: 13/414,847

(22) Filed: Mar. 8, 2012

(65) Prior Publication Data

US 2012/0314352 A1 Dec. 13, 2012

(30) Foreign Application Priority Data

Jun. 13, 2011 (CN) .......................... 201110157415.6

(51) Int. Cl.
| | |
|---|---|
| H05K 5/00 | (2006.01) |
| H05K 7/00 | (2006.01) |
| A47B 95/02 | (2006.01) |
| A47J 45/00 | (2006.01) |
| B65D 25/28 | (2006.01) |
| E05B 1/00 | (2006.01) |
| E05B 7/00 | (2006.01) |

(52) U.S. Cl.
USPC ..................................... 361/679.59; 16/110.1

(58) Field of Classification Search
USPC ............. 361/679.55, 679.56, 679.26, 679.27, 361/679.28, 679.29, 679.3, 679.37, 679.38, 361/679.39, 725, 726, 727, 679.59; 16/114.1, 405, 408, 409, 410, 110.1
See application file for complete search history.

(56) References Cited

U.S. PATENT DOCUMENTS

| | | | | |
|---|---|---|---|---|
| 5,351,508 | A  * | 10/1994 | Kelley ............................... | 70/58 |
| 5,765,933 | A  * | 6/1998 | Paul et al. .................. | 312/332.1 |
| 7,639,495 | B2 * | 12/2009 | Chen et al. ................. | 361/679.6 |
| 8,023,270 | B2 * | 9/2011 | Chen ............................ | 361/747 |
| 8,439,320 | B2 * | 5/2013 | Huang et al. ............. | 248/221.11 |

* cited by examiner

*Primary Examiner* — Anthony Haughton
(74) *Attorney, Agent, or Firm* — Novak Druce Connolly Bove + Quigg LLP

(57) ABSTRACT

An electronic device enclosure includes a bracket and a handle. The bracket includes a front plate, a first securing piece, and a resilient tab. The resilient tab is secured to the front plate. The handle includes a handhold and a first mounting portion extending from the handhold. The first mounting portion is pivotably mounted to the first securing piece. The first mounting portion defines a pivot axis. The first mounting portion includes a first side surface, a second side surface, and a connecting surface connected between the first side surface and the second side surface. A distance between the first side surface and the pivot axis and a distance between the second side surface and the pivot axis are both less than a distance between the connecting surface and the pivot axis. The connecting surface resists against the resilient tab to be deformed when the first mounting portion rotates.

18 Claims, 3 Drawing Sheets

ELECTRONIC DEVICE ENCLOSURE

BACKGROUND

1. Technical Field

The present disclosure relates to electronic device enclosures, more particularly to an electronic device enclosure with a handle.

2. Description of Related Art

In many computer enclosures, a bracket is provided for receiving an electronic component, such as a disk drive or a power supply. However, space in the enclosure may be very limited, making it difficult to install and remove the bracket. Therefore, an improved computer enclosure may be desired.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
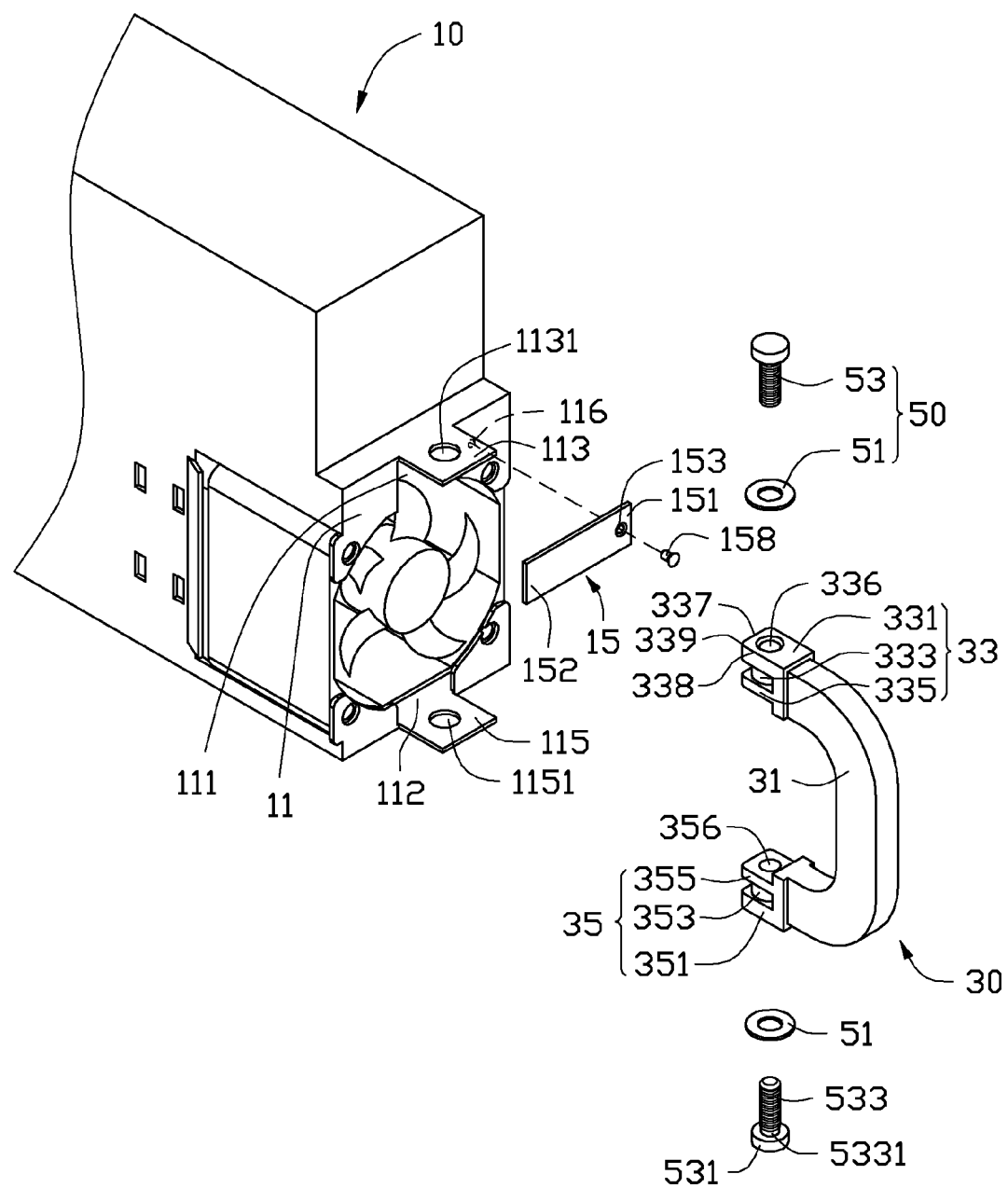
FIG. 1 is an exploded, isometric view of an electronic device enclosure in accordance with an embodiment.
Figure 2:
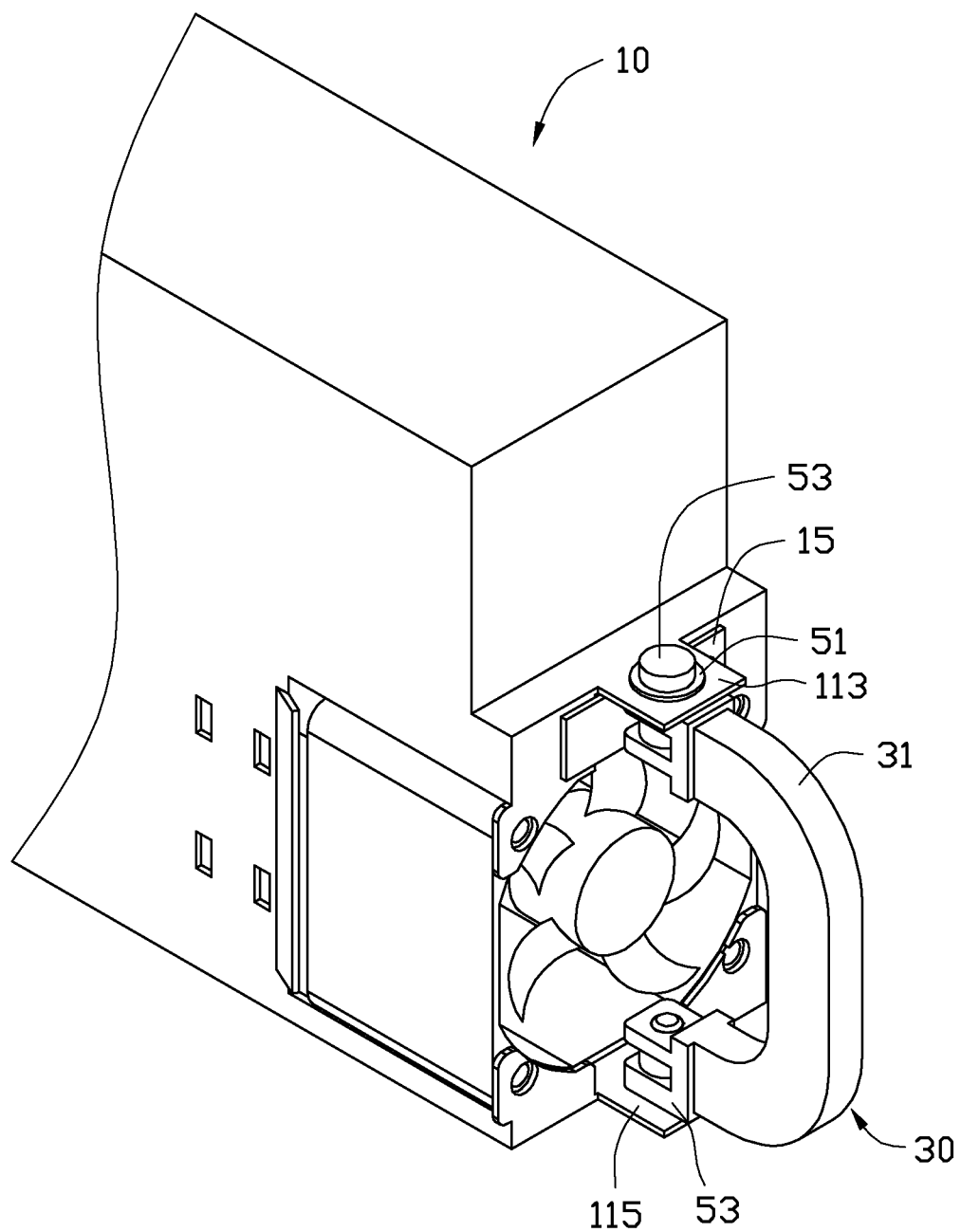
FIG. 2 is an assembled view of FIG. 1, showing a handle in a first position.

Referring to FIGS. 1 and 2, an electronic device enclosure in accordance with an embodiment includes a bracket 10 (only a portion of the bracket 10 is shown) and a handle 30 attached to the bracket 10. In one embodiment, the bracket 10 can be received in a computer case, and an electronic component, such as a disk drive, can be received in the bracket 10.

The bracket 10 includes a front plate 11 with a first opening 111 and a second opening 112. The first opening 111 and the second opening 112 are arranged in a line. A first securing piece 113 with a first pivot hole 1131, extends from a top edge of the first opening 111. A second securing piece 115 extends from a bottom edge of the second opening 112. The second securing piece 115 defines a second pivot hole 1151 aligned with the first pivot hole 1131. In one embodiment, the first securing piece 113 is substantially parallel to the second securing piece 115 and substantially perpendicular to the front plate 11. The front plate 11 defines a securing hole 116. The bracket 10 further includes a resilient tab 15. The resilient tab 15 includes a first end 151 and a second end 152. The first end 151 defines a mounting hole 153. The resilient tab 15 is configured to cover the first opening 111. In one embodiment, a fastener 158 passes through the mounting hole 153 and the securing hole 116 to secure the resilient tab 15 on the front plate 11.

The handle 30 includes a handhold 31, a first mounting portion 33 connected to a first end of the handhold 31, and a second mounting portion 35 connected to a second end of the handhold 31. The handle 30 is U-shaped. In one embodiment, the first mounting portion 33 is substantially parallel to the second mounting portion 35. The first mounting portion 33 includes a first outer piece 331, a first inner piece 335, and a first post 333 connected between the first outer piece 331 and the first inner piece 335. The first mounting portion 33 defines a first through hole 336. The first through hole 336 extends through the first outer piece 331, the first inner piece 335 and the first post 333. The first outer piece 331 defines a first side surface 337, a second side surface 338, and a connecting surface 339 connected between the first side surface 337 and the second side surface 338. In one embodiment, the connecting surface is arc-shaped. A distance between an axis of the first through hole 336 and the first side surface 337 is substantially equal to a distance between the axis of the first through hole 336 and the second side surface 338, but less than a distance between the axis and the connecting surface 339. The first side surface 337 is substantially perpendicular to the second side surface 338. The second mounting portion 35 has the same structure as the first mounting portion 33. The second mounting portion 35 includes a second outer piece 351, a second inner piece 355, and a second post 353 connected between the second outer piece 351 and the second inner piece 355. The second mounting portion 35 defines a second through hole 356. The second through hole 356 extends through the second outer piece 351, the second inner piece 355 and the second post 353. The first through hole 336 and the second through hole 356 has inner screw thread.

Two fixing members 50 are provided for securing the handle 30 to the bracket 10. Each of the two fixing members 50 includes a screw 53 and a washer 51. The screw 53 includes a head portion 531 and a neck portion 533 extending from the head portion 531. The neck portion 533 defines a recess 5331 adjacent to the head portion 531. The neck portion 533 is configured to pass through the washer 51. The washer 51 is located in the recess 5331. The neck portion 533 has outer screw thread.

Figure 3:
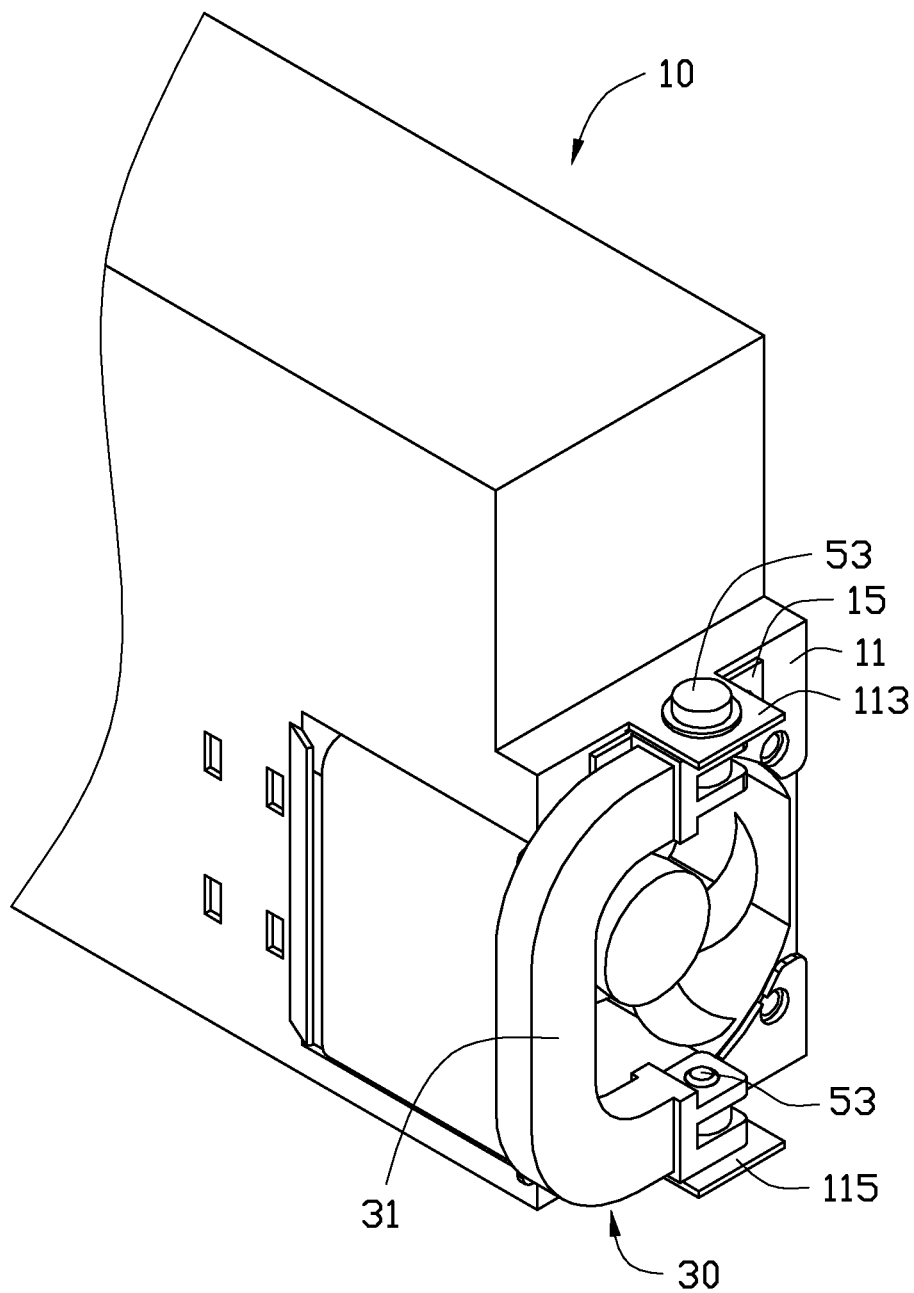
FIG. 3 is similar to FIG. 2, but showing the handle in a second position.

Referring to FIGS. 2-3, in assembly, the resilient tab 15 is secured to the front plate 11 via the fastener 158. The resilient tab 15 covers the first opening 111. The first through hole 336 of the first mounting portion 33 is aligned with the first pivot hole 1131. The second through hole 356 of the second mounting portion 35 is aligned with the second pivot hole 1151. The screws 53 of the two fixing members 50 passes through the washers 51 and the first pivot hole 1131 and the second pivot hole 1151 respectively, to be screwed into the first through hole 336 and the second through hole 356 of the handle 30. Thereby, the handle 30 is pivotably mounted to the bracket 10. At this time, the washers 51 contact the first outer piece 331 and the second outer piece 351. The handle 30 is located between the first securing piece 113 and the second securing piece 115.

The handle 30 is rotatable relative to the front plate 11 between a first position (see FIG. 2) and a second position (see FIG. 3). In the first position, the handhold 31 is substantially parallel to the front plate 11. The first side surface 337 contacts the resilient tab 15 and is parallel to the front plate 11. In the second position, the second side surface 338 contacts the resilient tab 15 and is parallel to the front plate 11. During the process of rotation from the first position to the second position, the connecting surface 339 presses the resilient tab 15 to be deformed in the first opening 111. The resilient tab 15 releases to contact the second side surface 338 when the handle 30 is located in the second position.

When the bracket 10 is received in the computer case, the handle 30 is rotated to the second position, so that the handle 30 occupies little space. To take the bracket 10 out of the computer case, the handle 30 is rotated to the first position, and the bracket 10 can be taken out from the computer case.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device enclosure comprising:
a bracket comprising a front plate, a first securing piece extending from the front plate, and a resilient tab; one end of the resilient tab secured to the front plate; the first securing piece substantially perpendicular to the front plate; and the resilient tab substantially parallel to the front plate; and
a handle comprising a handhold and a first mounting portion extending from the handhold; the first mounting portion pivotably mounted to the first securing piece; the first mounting portion defining a pivot axis; the first mounting portion comprising a first side surface, a second side surface, and a connecting surface connected between the first side surface and the second side surface; a distance between the first side surface and the pivot axis and a distance between the second side surface and the pivot axis being both less than a distance between the connecting surface and the pivot axis; the first side surface contacting the resilient tab when the first mounting portion is in a first position; the second side surface contacting the resilient tab when the first mounting portion is in a second position; and the connecting surface resisting against the resilient tab to be deformed when the first mounting portion rotates from the first position to the second position.

2. The electronic device enclosure of claim 1, wherein the front plate defines a first opening; the resilient tab covers the first opening; and the resilient tab is capable of being deformed into the first opening.

3. The electronic device enclosure of claim 2, wherein a first pivot hole is defined in the first securing piece; a first through hole is defined in the first mounting portion; and a fixing member passes through the first through hole and the first pivot hole to pivotably mount the first mounting portion to the first securing piece.

4. The electronic device enclosure of claim 3, wherein the fixing member comprises a screw and a washer; the screw passes through the washer to extend through the first through hole and the first pivot hole.

5. The electronic device enclosure of claim 1, wherein the first side surface is substantially perpendicular to the second side surface.

6. The electronic device enclosure of claim 1, wherein the distance between the first side surface and the pivot axis is substantially equal to the distance between the second side surface and the pivot axis.

7. The electronic device enclosure of claim 1, wherein the handle further comprises a second mounting portion extending from the handhold; the bracket further comprises a second securing piece; the second mounting portion is pivotably mounted to the second securing piece; and the handhold is located between the first securing piece and the second securing piece.

8. The electronic device enclosure of claim 7, wherein the handle is U-shaped.

9. An electronic device enclosure comprising:
a bracket comprising a front plate, a first securing piece extending from the front plate, and a resilient tab; one end of the resilient tab secured to the front plate; the first securing piece substantially perpendicular to the front plate; and the resilient tab substantially parallel to the front plate; and
a handle comprising a handhold and a first mounting portion extending from the handhold; the first mounting portion pivotably mounted to the first securing piece; the first mounting portion comprising a first side surface, a second side surface, and a connecting surface connected between the first side surface and the second side surface; the handle capable of rotating between a first position and a second position; the first side surface contacting the resilient tab in the first position; the second side surface contacting the resilient tab in the second position; and the connecting surface resisting against the resilient tab to be deformed during the rotation between the first position and the second position.

10. The electronic device enclosure of claim 9, wherein the first side surface is substantially perpendicular to the front plate in the first position.

11. The electronic device enclosure of claim 9, wherein the first side surface is substantially perpendicular to the second side surface.

12. The electronic device enclosure of claim 9, wherein the front plate defines a first opening; the resilient tab covers the first opening; and the resilient tab is capable of being deformed into the first opening.

13. The electronic device enclosure of claim 12, wherein a first pivot hole is defined in the first securing piece; a first through hole is defined in the first mounting portion; and a fixing member passes through the first through hole and the first pivot hole to pivotably mount the first mounting portion to the first securing piece.

14. The electronic device enclosure of claim 13, wherein the fixing member comprises a screw and a washer; the screw passes through the washer to extend through the first through hole and the first pivot hole.

15. The electronic device enclosure of claim 9, wherein the first mounting portion defines a pivot axis; a distance between the first side surface and the pivot axis is substantially equal to a distance between the second side surface and the pivot axis.

16. The electronic device enclosure of claim 15, wherein the distance between the first side surface and the pivot axis and the distance between the second side surface and the pivot axis are both less than a distance between the pivot axis and the connecting surface.

17. The electronic device enclosure of claim 9, wherein the handle further comprises a second mounting portion extending from the handhold; the bracket further comprises a second securing piece; the second mounting portion is pivotably mounted to the second securing piece; and the handhold is located between the first securing piece and the second securing piece.

18. The electronic device enclosure of claim 17, wherein the handhold is U-shaped.

* * * * *